United States Patent [19]

Kamiyama et al.

[11] 3,946,151

[45] Mar. 23, 1976

[54] SEMICONDUCTOR IMAGE SENSOR

[75] Inventors: Takamitsu Kamiyama, Kodaira; Mikio Ashikawa, Koganei, both of Japan

[73] Assignee: Hitachi, Ltd., Japan

[22] Filed: Feb. 14, 1974

[21] Appl. No.: 442,639

[30] Foreign Application Priority Data

Feb. 14, 1973 Japan.................. 48-17454

[52] U.S. Cl. ........................ 178/7.1; 178/DIG. 12
[51] Int. Cl.² ......................................... H04N 3/16
[58] Field of Search.............. 178/7.1, 7.2, DIG. 12; 250/211 R, 211 J, 578

[56] References Cited
UNITED STATES PATENTS
3,824,337  7/1974  Sangster et al. ............... 178/7.1

Primary Examiner—Albert J. Mayer
Attorney, Agent, or Firm—Craig & Antonelli

[57] ABSTRACT

In an image sensor having a large scale array of semiconductor photodetectors, only the noise component is delivered from a first photodetector subsequent to the readout of a stored signal, in synchronism with the readout of a signal of a second photodetector, so that the noise component may be utilized for the cancellation of the noise component in the output from the second photodetector.

23 Claims, 11 Drawing Figures

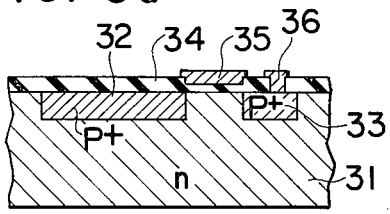
FIG. 3a
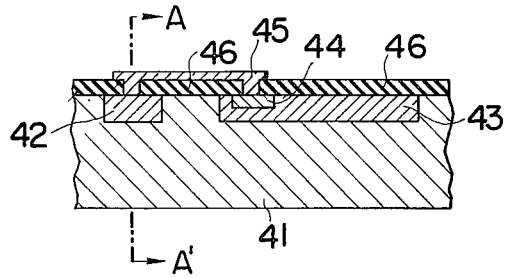
FIG. 4a
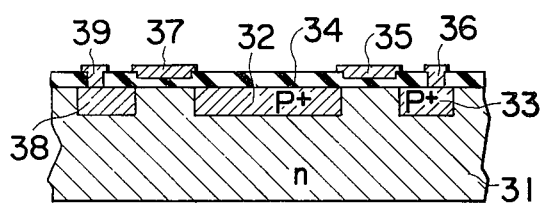
FIG. 3b
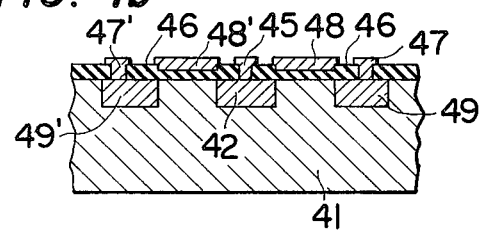
FIG. 4b
FIG. 5
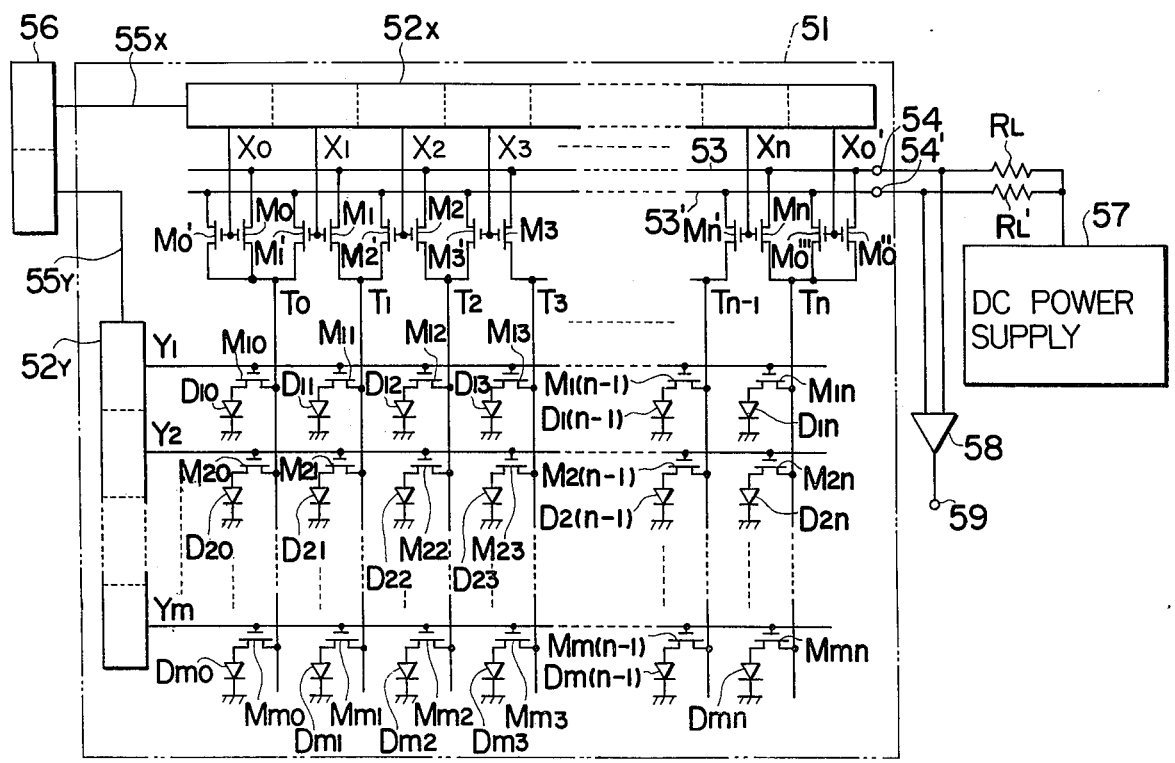

SEMICONDUCTOR IMAGE SENSOR

BACKGROUND OF THE INVENTION

The present invention relates to a semiconductor image sensor and, more particularly, to a low noise semiconductor image sensor.

DESCRIPTION OF THE PRIOR ART

In a linear photosensor array for facsimile reproduction and an area photosensor array for a television camera or a holographic optical memory, it is generally necessary to have a high integration density and for the constituent elements to have no defects. Therefore, semiconductor image sensors fabricated by means of MOS integrated circuit technology, which has become highly developed, offer great promise in the art. The image sensors now being developed are constructed by integrating photosensors, each of which includes a photodiode or phototransistor as the photodetector element and an metal-oxide-semiconductor field-effect-transistor (hereinbelow abbreviated MOSFET) connected thereto as a switching element. In this type of sensor, there is the problem that spike noise is generated due to the fact that a voltage pulse applied to the gate of the MOSFET for reading out a signal in order to turn the transistor "on", leaks through the gate-drain capacitance onto the load resistance side. Furthermore, where the optical input to the photodetector element is small, it is sometimes the case that during signal read-out, the spike noise component is larger than the information signal component and that the signal component is "buried" in the spike noise. The spike noise must accordingly, be eliminated. To this end, there have been proposed the so-called delayed sampling system in which only the signal component is derived by sampling, and a system in which only the spike noise is eliminated by a differential amplifier. The former is effective where the signal component lags the spike noise, while the latter is effective where the spike noise and the signal component overlap each other.

An image sensor has also been proposed in which the spike noise of a parallel readout type photodiode — MOSFET area photosensor array, adapted to operate in the photo-charge storage mode (the integration mode), is eliminated by the use of a differential amplifier. In such a device, m × n p$^+$ − n photodiodes are respectively connected to the sources of m × n p-channel enhancement MOSFETs. N digit lines interconnect the drains of the MOSFETs at the first to n-th columns, respectively. An array of n load resistors, each having the same resistance, is connected to the respective digit lines. M word lines interconnect the gates of the MOSFETs at the first to m-th rows, respectively. Address pulses are applied to the word lines from a scan generator. The gates of n-numbers of p-channel enhancement MOSFETs for differential operation, the respective sources of which serve as p$^+$ −n photodiodes, i.e. n diodes, are connected to a common reference pulse line. N load resistors for the differential operation, having the same resistance as the array of load resistors, are connected to the drains of the respective MOSFETs for differential operation. To one terminal of each of the array of load resistors and the load resistors for differential operation, a negative potential is applied from a DC power source. Outputs from the two types of load resistors are supplied to n differential amplifiers.

The spike noise eliminating operation of such an image sensor is effected as follows. When reading out optical information which is stored in, for example, the photodiodes of the second row on the word line of the second row negative voltage pulses are fed to the word line $W_2$ and the reference pulse line from the scan generator, to turn the MOSFETS of the second row and the respective MOSFETs for differential operation on. Read outputs appearing in the respective load resistors $RL_1$ to $RL_n$ are combinations of signal components which correspond to optical information stored in the respective photodiodes with spike noise components which are equal in principle, in all the array load resistors. On the other hand, only the spike noise components appear in the respective load resistors for the differential operation because the corresponding photodiodes are in the dark state. Therefore, when the outputs appearing in the load resistors and the outputs appearing in the resistors for differential operation are delivered to the respectively corresponding differential amplifiers, only the information signal components are delivered therefrom, insofar as the spike noise components of the array of load resistors and the load resistors for differential operation are equal. This is a standard operation of the differential amplifiers.

It is a necessary condition for the elimination of the spike noise that the spike noise components to be delivered to each differential amplifier be equal to each other. In such a device, however, the digit lines, for example, have stray capacitances, and the circuit part of the array of load resistors and that of the load resistors for differential operation do not have identical circuit parameters, so that it is extremely difficult to make the spike noise components from both circuit parts equal. As a simple measure for removing this difficulty, there may be provided a system in which two photosensor arrays of the same type are arranged, one of the arrays used for optical information detection and the other for differential operation, and equal spike noises are derived from the respective arrays and are cancelled in a differential amplifier. With this system measure, however, the number of photodetector elements and MOSFETs to be employed is doubled. When producing a large scale device, this inevitably involves the disadvantage that the entire system becomes complicated and that integration is difficult.

SUMMARY OF THE INVENTION

In view of the foregoing, the present invention has as an object the provision of a low noise semiconductor image sensor which can eliminate spike noises substantially perfectly without a substantial increase in the number of necessary photodetector elements, so that a large scale array can be easily constructed.

In order to accomplish this object, the image sensor according to the present invention consists of first and second pairs of field-effect transistors, the field-effect transistors of each pair having common sources, the field-effect transistors of the respective pairs reading out signals from first and second photosensitive elements (for example, photodiodes, phototransistors, or the like) through the common sources. The drains of the field-effect transistors on one side of the respective pairs are interconnected by a first output line, while the drains of the field-effect transistors on the other side are interconnected by a second output line; differential amplifier means is provided to which outputs read out at the first and second output lines are delivered, the gate of the one-side field-effect transistor of the first pair and the gate of the other-side field-effect transistor of the second pair are interconnected by an input line; when no stored signal is present in the first photosensitive element, a signal readout pulse is applied to the input line, and equal spike noise outputs which are then generated in the first and second output lines are cancelled by the differential amplifier means, so as to obtain only the information signal.

According to the above construction of the present invention, in the first place, only noise components are extracted from the first photosensitive element subsequent to readout of the stored signal, in synchronism with the readout of a signal in the second photosensitive element, and this noise component is utilized for elimination of the noise component in the output from the second photosensitive element. As a result, at most, one or two auxiliary photosensitive elements for eliminating the noise may be sufficient per word line or per linear photosensor array. The fact that the number of the photosensitive elements may be small, in this manner, facilitates the high density integration of the photosensor array. Secondly, since the number of the field-effect transistors connected to the first and second output lines are equal, it is easy to equalize both the output lines with respect to their electrical characteristics, such as stray capacitance. Accordingly, substantially equal noise components are obtained at the output lines, and the cancellation of the noise components in a differential amplifier or the like is achieved substantially perfectly. Thirdly, since the sources of the paired field-effect transistors are disposed in common, this construction is readily adapted for integration. It is also possible to easily manufacture a large scale array by utilizing such a common source as a part of the photodiode.

Hereunder, the present invention will be described in detail in connection with its preferred embodiments. Although the description will be made of the $p^+ - n$ photodiode $-p$-channel MOSFET system, the essential operation applies also to the $n^+ - p$ photodiode $-n$-channel MOSFET system.

It is a matter of course that the construction, the signal processing system etc. of the image sensor according to this invention can be subject to various modifications without departing from the spirit and scope of the present invention.

BRIEF DESCRIPTION OF THE DRAWING

FIGS. 3a and 3b are sectional views of elements of an integrated photosensor array each including a photodiode, which array is utilized for the practical application of the present invention;

FIGS. 4a and 4b are sectional views of another integrated photosensor array including a phototransistor, which array is utilized for the practical application of the present invention;

FIG. 5 is a circuit diagram of an image sensor according to the present invention;

DESCRIPTION OF THE PREFERRED EMBODIMENTS

EXAMPLE 1

Figure 1:
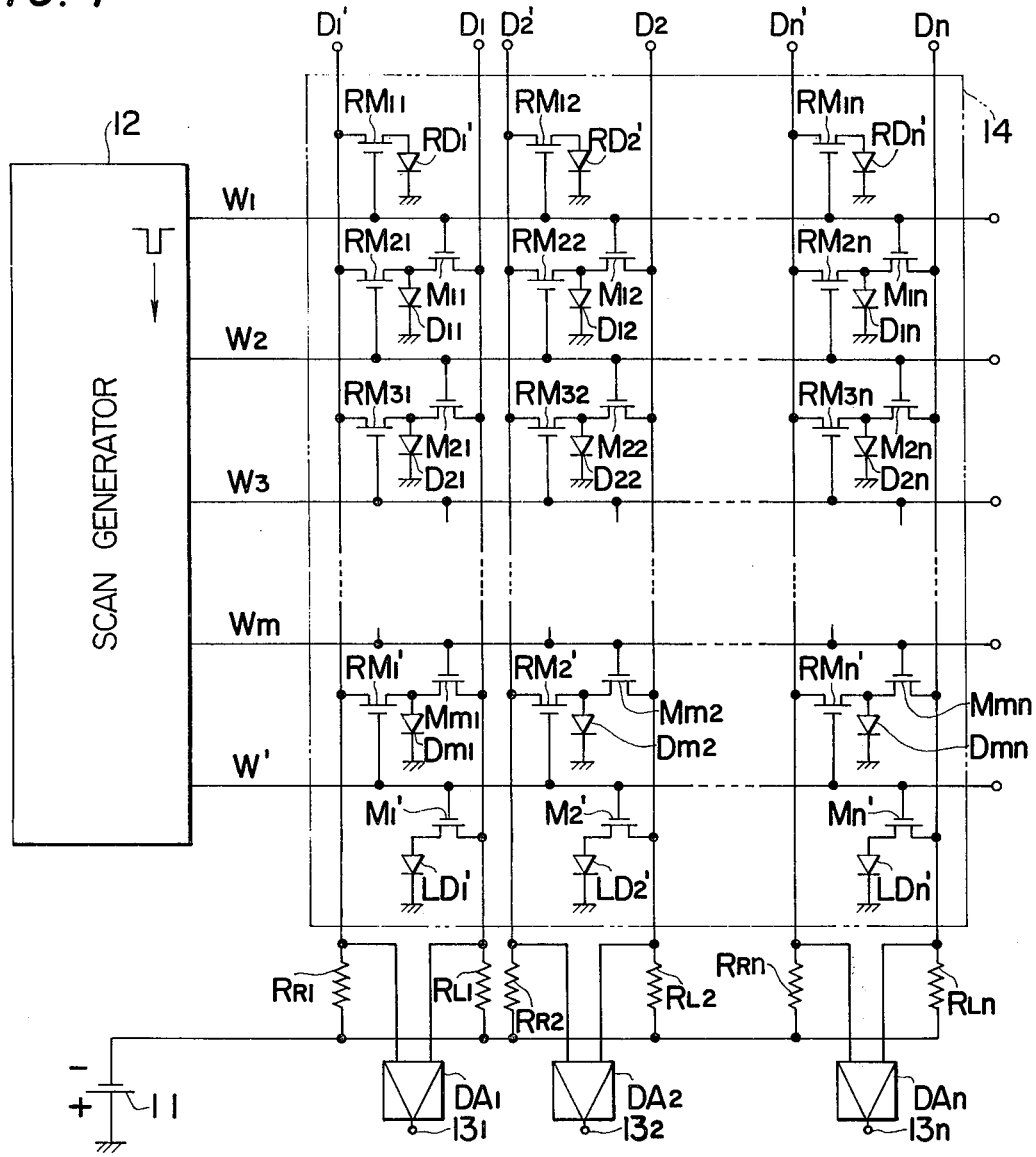
FIG. 1 is a circuit diagram of an image sensor in which the spike noises of word organized mode photodiode-MOSFET area photosensor arrays adapted to operate in the photo-charge storage mode are eliminated by differential amplifiers.

Referring to FIG. 1, $D_{11}$ to $D_{1n}$; $D_{21}$ to $D_{2n}$ . . . ; $D_{m1}$ to $D_{mn}$ designate photodiodes for optical information detection, which are respectively connected to the common sources of MOSFET pairs ($RM_{21}$ and $M_{11}$) to ($RM_{2n}$ and $M_{1n}$); ($RM_{31}$ and $M_{21}$) to ($RM_{3n}$ and $M_{2n}$) . . . ($RM_1'$ and $M_{m1}$) to ($RM_n'$ and $M_{mn}$). The first group of auxiliary MOSFETs $RM_{11}$ to $RM_{1n}$ having the first group of auxiliary photodiodes $RD_1'$ to $RD_n'$ connected to the sources, respectively, are used together with the MOSFETs $RM_{21}$ to $RM_{2n}$; $RM_{31}$ to $RM_{3n}$( ; etc. in the detection of spike noise for differential operation. To the sources of the second group of auxiliary MOSFETs $M_1'$ to $M_n'$, there are respectively connected the second group of auxiliary photodiodes $LD_1'$ to $LD_n'$. The second group of photodiode-MOSFET pairs are provided in correspondence with the above-mentioned first group of photodiode-MOSFET pairs. For example, the pair of the photodiode $LD_1'$ and the MOSFET $M_1'$ functions to equalize the electrical characteristics, such as stray capacitances, of the digit line $D_1'$ for the differential operation which commonly connects the drains of the MOSFET $RM_{11}$ to $RM_1'$ at the first column and the digit line $D_1$ which commonly connects the drains of the MOSFETs $M_{11}$ to $M_{m1}$ and $M_1'$ at the first column. Such a function applies to the other digit lines $D_2'$ and $D_2$. . . ; $D_n'$ and $D_n$. $W_1$ to $W_m$ denote word lines at the first to m-th rows, which are adapted to commonly drive the gates of sets of MOSFETs ($RM_{11}$ and $M_{11}$) to ($RM_{1n}$ and $M_{1n}$); ($RM_{21}$ and $M_{21}$) to ($RM_{2n}$ and $M_{2n}$) . . . at the respective rows. The MOSFETs $RM_1'$ to $RM_n'$ are switching MOSFETS for clearing the photodiodes $D_{m1}$ to $D_{mn}$ corresponding to the word line $W_m$. Shown at W' is a drive line for these clearing MOSFETs. The word lines $W_1$ to $W_m$ and the clearing drive line W' receive predetermined pulses from a scan generator 12. Load resistors $R_{R1}$ to $R_{Rn}$ for differential operation are connected to the respective digit lines $D_1'$ to $D_n'$, for differential operation, while array load resistors $RL_1$ to $RL_n$ are connected to the respective digit lines $D_1$ to $D_n$. A negative potential is supplied to these two types of resistors from a DC power source 11. Signal outputs are delivered from the respective sets of resistors ($R_{R1}$ and $R_{L1}$) to ($R_{Rn}$ and $R_{Ln}$) to differential amplifiers $DA_1$–$DA_n$. Output pulses from output terminals $13_1$, $13_2$ . . . , $13_n$ of the respective differential amplifiers are delivered to an electronic computer or the like.

The circuit operation of the device in FIG. 1 will now be explained. After optical information is incident on, and stored in, the m × n matrix of photodiodes $D_{11}$ to $D_{mn}$, the scan generator 12 is rendered operative. In the first place, a negative voltage pulse is applied to the first word line $W_1$. Then the readout MOSFETs $M_{11}$ to $M_{1n}$ and the differential operation MOSFETs $RM_{11}$ to $RM_{1n}$ turn on. Consequently, in the respective array of load resistors $RL_1$ to $RL_n$, output signals appear which are the sums of signals corresponding to the optical information stored in the corresponding photodiodes $D_{11}$ to $D_{1n}$ and spike noise. On the other hand, only spike noise appears in the differential operation load resistors $R_{R1}$ to $R_{Rn}$ because the corresponding photodiodes $RD_1'$ to $RD_n'$ have in the dark state and, hence, have no stored signal component. Here, each set of the two types of digit lines, for example, $D_1$ and $D_1'$ coupled to the corresponding set of the two types of load resistors is symmetrical in the circuit, as is apparent from FIG. 1. For this reason, the stray or parasitic capacitances, etc. in both lines are equal, and spike noise components appearing in the two types of load resistors are substantially equal. Accordingly, the spike noise components are substantially eliminated by the differential amplifiers $DA_1$ to $DA_n$, and only the amplified pulses corresponding to the optical information stored in the photodiodes $D_{11}$ to $D_{1n}$ on the word line $W_1$ is delivered from the output terminals $13_1$, $13_2$ ( . . . $13_n$.

The photodiodes $D_{11}$ to $D_{1n}$ having had the readout completed are charged to be placed in the same dark state as the differential operation photodiodes $RD_1'$ to $RD_n'$. When the voltage pulse output of the scan generator 12 is subsequently shifted to the second word line $W_2$, the readout MOSFETs $M_{21}$ to $M_{2n}$ and the differential operation MOSFETs $RM_{21}$ to $RM_{2n}$ turn on. At this time, optical information signals are stored in the photodiodes $D_{21}$ to $D_{2n}$, while the photodiodes $D_{11}$ to $D_{1n}$ are charged and act similarly to the photodiodes $RD_1'$ to $RD_n'$. Therefore, as in the case where the negative voltage pulse was applied to the first word line $W_1$, only the amplified pulses corresponding to the optical information stored in the photodiodes $D_{21}$ to $D_{2n}$ are delivered from the differential amplifiers $DA_1$ to $DA_n$.

In this way, the output voltage pulse trains corresponding to the optical information incident on the sets of photodiodes $D_{11}$, $D_{12}$ . . . $D_{1n}$; $D_{21}$, $D_{22}$ . . . $D_{2n}$ . . . $D_{m1}$, $D_{m2}$ . . . $D_{mn}$ corresponding to the word lines $W_1$, $W_2$ . . . $W_n$ can be sequentially read out in the state in which spike noise is eliminated. Thus, the photodiodes, for which stored optical information has been read out, are operated as differential operation photodiodes at the time when the optical information stored in the photodiodes of the succeeding stage are to be read out. Thus, the complexity of employing two area arrays of the same type for the elimination of the spike noise is avoided.

Simultaneously therewith, the previous difficulty in eliminating spike noise due to the difference between the spike noise components as in the foregoing prior-art device is solved. A further feature is that since the same photodiode is subjected to the readout operation twice, a small component of stored information remaining after the first operation can be cleared by the second operation. According to experiments, it has been known that such a component read out during the second operation exerts almost no influence on the information signal, read out from the succeeding stage photodiode. The clearing word line $W'$ in FIG. 1 clears the foregoing components remaining unread by the first operation, for the array of photodiodes $D_{m1} - D_{mn}$.

It will be understood from the above explanation that the image sensor in FIG. 1 has the function of the word organized mode area photosensor array which operates in the photo-charge storage mode and which can perfectly eliminate the spike noise. Due to the perfect elimination of spike noise, the image sensor is very useful as a photosensor for detecting optical inputs at low levels, for example, an image sensor for holographic optical memory. As is apparent to those skilled in the art, that part 14 in FIG. 1 which is enclosed by chain lines can be easily integrated on one chip by the use of present day MOSIC technology.

EXAMPLE 2

Figure 2:
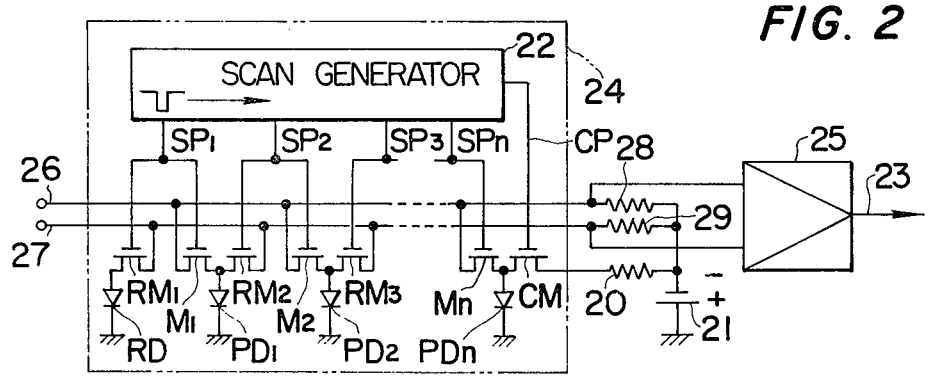
FIG. 2 is a diagram showing the circuit arrangement of a linear photosensor array for facsimile reproduction.

Referring to FIG. 2, $PD_1$ to $PD_n$ designate photodiodes for detecting optical information. A photodiode RD for differential operation is always in the dark state. $M_1$ to $M_n$ indicate MOSFETs for readout, among which $M_1$ to $M_{(n-1)}$ have their sources in common with the sources of MOSFETs $RM_2$ to $RM_n$ for differential operation, respectively. The photodiodes $PD_1$ to $PD_{(n-1)}$ are connected to the respective common sources. An auxiliary MOSFET $RM_1$ having the auxiliary photodiode RD connected to the source is provided in order to aid the readout operation of the MOSFET $M_1$. CM is a clearing MOSFET which is paired with the readout MOSFET $M_n$ and which receives a clear pulse. The photodiode $PD_n$ is connected to the common source of the clearing MOSFET CM, while load resistor 20 is connected to the drain. To power source lines 26 and 27, the drains of the readout MOSFETs $M_1$ to $M_n$ and the drains of the differential operation MOSFETs $RM_1$ to $RM_n$ are connected, respectively, and load resistors 28 and 29 are also connected, respectively. Readout outputs from the load resistors 28 and 29 on which a negative potential is applied from a DC power source 21 are delivered to a differential amplifier 25. Pulse lines $SP_1$ to $SP_n$ connected to a scan generator 22 serve to drive the commonly-connected gates of the sets of MOSFETs ($RM_1$ and $M_1$), ($RM_2$ and $M_2$) . . . ($RM_n$ and $M_n$).

The circuit operation of the device in FIG. 2 is the same, in principle, as in the previous example. The scan generator 22 applies a negative voltage pulse at first to the line $SP_1$. Then, the MOSFETs $RM_1$ and $M_1$ turn on, with the result that an output signal made up of the sum of a signal corresponding to optical information stored in the photodiode $PD_1$ and spike noise appears in the load resistor 28, whereas only spike noise appears in the load resistor 29 since the differential operation photodiode RD is in the dark state. The two spike noise components are essentially equal because, as seen in FIG. 2, the types and numbers of the elements connected to the lines 26 and 27 are the same. Consequently, the spike noise is perfectly eliminated by the differential amplifier 25, and only the information signal amplified is provided from an output terminal 23 of the differential amplifier 25.

Subsequently, when the address pulse is shifted to the line $SP_2$, the MOSFETs $RM_2$ and $M_2$ turn on. At this time, optical information is stored in the photodiode $PD_2$, while the photodiode $PD_1$ has already had the information readout completed and is in the same state as that of the differential operation photodiode RD. Therefore, similarly to the operation of the preceding stage, only an amplified output pulse corresponding to the optical information stored in the photodiode $PD_2$ appears at the output terminal 23 of the differential amplifier 25. The optical information stored in the photodiodes $PD_1$ to $PD_n$ is sequentially read out in this manner. The spike noise components are therefore eliminated. Upon completion of the readout of the optical information stored in the photodiode $PD_n$, the address pulse returns to the pulse line $SP_1$ again, and the above operation is repeated.

The feature of the device of Example 2 is that two MOSFETs connected to the same photodiode are sequentially turned on one of the MOSFETs operating for reading out the information signal and the other for deriving spike noise. Accordingly, the storage of the optical information in the photodiode must be effected after the completion of the readout from the particular diode by the first signal readout MOSFET and in a period from the time at which the second noise deriving MOSFET turns "off" to the time at which the first MOSFET turns on again. In view of this point, in order to establish the same operative condition for all the photodiodes, the clearing MOSFET CM is connected to the last photodiode $PD_n$. At the same time that the address pulse is applied through the pulse line $SP_1$ to the MOSFETs $RM_1$ and $M_1$, the same voltage pulse as the address pulse is applied through the clear pulse line CP to the clearing MOSFET CM.

As explained above, the image sensor shown in FIG. 2 is a linear image sensor which can essentially eliminate spike noise with simple structure and which can effect signal amplification. It is useful when employed for facsimile reproduction, etc. As is apparent to those skilled in the art, that part of the device in FIG. 2 which is enclosed by chain lines 24 can be easily integrated using present-day MOSIC technology.

In the circuits in FIGS. 1 and 2, two MOSFETs and one photodiode are included in the unit construction of the photosensor. Although this adds one MOSFET to those used in the foregoing prior-art device, integration is not especially difficult by the added element.

FIGS. 3a and 3b are sectional views of an integrated photosensor array which are utilized in a practical application of the present invention. In FIG. 3a, a $p^+ - n$ junction made of an n-type semiconductor single crystal substrate 31 and a $p^+$ —type diffused region is used as a photodiode. A switching MOSFET is formed by $p^+$ —type diffused region (source) 32 along with another $p^+$ —type diffused region (drain) 33 having a metal electrode 36, an insulating layer 34 and a gate electrode 35. The semiconductor device shown in FIG. 3a can, accordingly, be employed as the auxiliary photodiode — MOSFET pair (for example, $RD_1'$ to $RM_{11}$) previously discussed. FIG. 3b shows, in section, an example of the integrated MOSFET pair—photodiode structure which is utilized in the present invention. One MOSFET is formed by $p^+$ —type diffused region (source) 32 of a photodiode along with another $p^+$ —type diffused region (drain) 33 having a metal electrode 36, an insulating layer 34 and a gate metal electrode 34, and simultaneously another MOSFET is formed by region 32 with still another $p^+$ —type diffused region (drain) 38 having a metal electrode 39, the insulating layer 34 and a gate electrode 37. The $p^+$ —type region 32 constitutes the source common to both the MOSFETS. One MOSFET can be used for the readout of the information signal, and the other for differential operation (for the derivation of noise). It is to be understood that the semiconductor device in FIG. 3b is formed by, for example a single and simultaneous diffusion step, and that the number of manufacturing steps is not especially increased over a process for forming the structure in FIG. 3b by a single diffusion step.

As a modification of the embodiment in FIG. 3b, a phototransistor can be used in lieu of the photodiode. FIGS. 4a and 4b are sectional views showing such modification. FIG. 4b is taken along a line A–A' in FIG. 4a. Referring to these figures, a $p^+$ —type diffused region 42 as a common source, a $p^+$ —type diffused region 43 as a base, and $p^+$ —type regions 49, 49' as drains are formed at the same time in the surface of a substrate 41 by, for example, impurity diffusion. Within the $p^+$ —type region 43, an n-type diffused region 44 is provided as an emitter. The regions 43 and 44 constitute a phototransistor whose collector is the substrate 41. The emitter region 44 is connected by an interconnection 45 to the region 42 forming the source common to the two MOSFETs. Numeral 46 represents an insulating film. One of the MOSFETs comprises the drain region 49, the source region 42, an insulated-gate electrode 48 and a drain electrode 47, while the other MOSFET comprises drain region 49, source region 42, insulated-gate electrode 48' and drain electrode 47'. As described above, one MOSFET can be utilized for deriving the information signal and the other for deriving the noise. Where the phototransistor is used in this manner, the photosensitivity can be made higher than in the case of the photodiode, and the operating principle for spike noise elimination does not essentially differ.

EXAMPLE 3

FIG. 5 shows a circuit diagram of a sequential readout image sensor according to the present invention. Referring to the figure, $D_{11}, d_{12} \ldots D_{1n}; D_{21}, D_{22} \ldots D_{2n} \ldots; D_{m1}, D_{m2} \ldots D_{mn}$ (where m and n denote positive integers, m ≧ 2 and n ≧ 2) designate photodiodes for detecting optical information, which are respectively connected to the sources of MOSFETs $M_{11}, M_{12} \ldots M_{1n}; M_{21}, M_{22} \ldots M_{2n} \ldots; M_{m1}, M_{m2} \ldots M_{mn}$. Auxiliary photodiodes $D_{10}, D_{20} \ldots D_{m0}$ are respectively connected to the sources of auxiliary MOSFETs $M_{10}, M_{20} \ldots M_{m0}$. $Y_1, Y_2 \ldots Y_m$ indicate vertical address pulse input lines of MOSFET groups $(M_{10}, M_{11} \ldots M_{1n})$, $(M_{20}, M_{21} \ldots M_{2n}) \ldots (M_{m0}, M_{m1} \ldots M_{mn})$, respectively. The pulse input lines interconnect the gates of the MOSFETs of the corresponding groups, and serve to sequentially switch the respective groups. Further, they are connected to output lines at the respective bits of an m-bit vertical scan generator 52Y.

Transmission lines $T_0, T_1, T_2 \ldots T_n$ interconnect the drains of MOSFET groups $(M_{10}, M_{20} \ldots M_{m0})$, $(M_{11}, M_{21} \ldots M_{m1})$, $(M_{12}, M_{22} \ldots M_{m2}) \ldots, (M_{1n}, M_{2n} \ldots M_{mn})$, respectively, and function to sequentially transmit optical information, incident on photodiode groups $(D_{10}, D_{11}, D_{12} \ldots D_{1n}), (D_{20}, D_{21}, D_{22} \ldots D_{2n}) \ldots, (D_{m0}, D_{m1}, D_{m2}, D_{m3} \ldots D_{mn})$, to the common sources of the corresponding horizontal scan switching MOSFET groups $(M_0', M_0, M_1'), (M_1, M_2'), (M_2, M_3'), (M_3, M_4') \ldots, (M_n, M_0''', M_0'')$. An output line for the signal readout 53 interconnects the drains of the horizontal switching MOSFETs $M_0, M_1, M_2, M_3 \ldots M_n, M_0''$. An output line 53' for differential operation interconnects the drains of the horizontal scan switching MOSFETs $M_0', M_1', M_2', M_3', M_4' \ldots, M_0'''$. Shown at 54 and 54' are an output terminal for the signal readout and an output terminal for the differential operation, respectively.

$X_0, X_1, X_2, X_3 \ldots X_n, X_0'$ designate horizontal address pulse input lines which interconnect the gates of horizontal scan switching MOSFET pairs ($M_0'$, $M_0$), ($M_1'$, $M_1$), ($M_2'$, $M_2$), ($M_3'$, $M_3$) ... ($M_n'$, $M_n$), ($M_0'''$, $M_0''$), respectively and which are connected to output lines at the respective bits of an (n + 2) -bit horizontal scan generator 52X.

A part enclosed by a chain line 51 can be integrated on an n-type semiconductor single crystal substrate. It is possible to impart essentially equal electrical characteristics to all the photodetector elements, the MOSFETs $M_{10}$, $M_{11}$, $M_{12}$ ... $M_{1n}$, $M_{20}$, $M_{21}$, $M_{22}$ ... $M_{2n}$ ... , $M_{m0}$, $M_{m1}$, $M_{m2}$ ... $M_{mn}$, the MOSFETs $M_0'$, $M_0$, $M_0'''$, $M_0''$, and the MOSFETs $M_1'$, $M_1$, $M_2'$, $M_2$ ... , $M_n'$, $M_n$, respectively. In particular, essentially equal electrical characteristics can be imparted to the respective MOSFET pairs adjacent to each other and having the gates connected to each other, ($M_1'$, $M_1$) ... , ($M_n'$, $M_n$). Reference numeral 56 represents a driver which functions to drive the horizontal scan generator 52X and the vertical scan generator 52Y, and from which drive lines 55X and 55Y for the respective generators 52X and 52Y are led. The output terminals 54 and 54' are connected through the respective load resistors $R_L$ and $R_L'$ to a common DC bias power source 57, and are also connected to two input terminals of a differential amplifier 58. The differential amplifier has an output terminal 59.

The operation of the circuit of FIG. 5 will now be described in detail.

Figure 6:
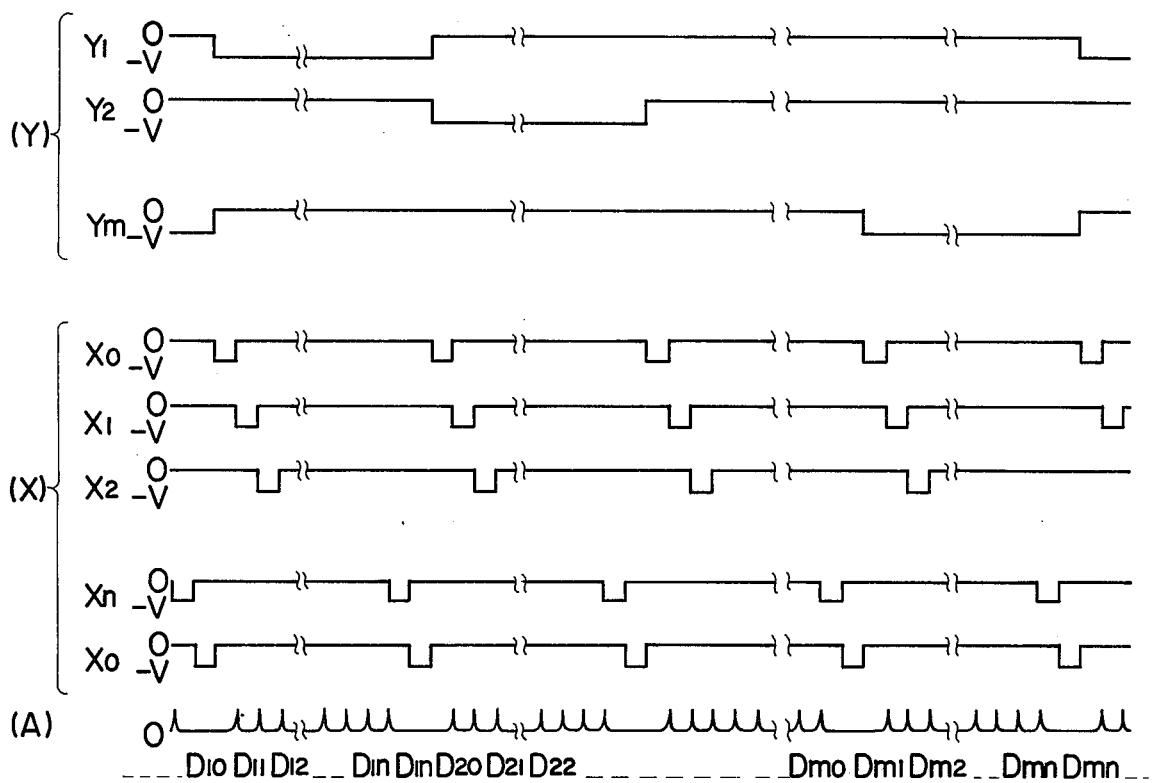
FIG. 6 is a timing chart showing horizontal address pulses and vertical address pulses which serve to sequentially read out optical information having come into incidence on photodiodes in the image sensor in FIG. 5, and readout outputs which are provided from a differential amplifier.

The horizontal scan generator 52X and the vertical scan generator 52Y are rendered operative by means of the driver 56, to generate horizontal address pulses shown at (X) in FIG. 6 and vertical address pulses shown at (Y), respectively. They are respectively applied to the corresponding horizontal address pulse input lines and vertical address pulse input lines in FIG. 5. Consider where the vertical address pulse input line $Y_1$ in FIG. 5 has been applied with the corresponding vertical address pulse $Y_1$ in FIG. 6. All the MOSFETs $M_{10}$, $M_{11}$, $M_{12}$ ... $M_{1n}$ become conductive. Optical information stored in the respective photodiodes $D_{10}$, $D_{11}$, $D_{12}$ ... $D_{1n}$ in the form of charges is transmitted through the respective MOSFETs mentioned above and through the respective transmission lines $T_0$, $T_1$, $T_2$ ... $T_n$ to the common sources of the respective MOSFET groups ($M_0'$, $M_0$, $M_1'$), ($M_1$ $M_2'$), ($M_2$, $M_3'$) ... , ($M_n$, $M_0'''$, $M_0''$).

As is illustrated in FIG. 6, at the same time that the vertical address pulse is applied to the vertical address pulse input line $Y_1$, the horizontal address pulses are sequentially applied to the horizontal address pulse input lines $X_0$, $X_1$, $X_2$ ... $X_n$, $X_0'$. Accordingly, the paired MOSFETs $M_0'$ and $M_0$ are first turned on. The stored charges of the auxiliary photodiode $D_{10}$, transmitted to the transmission line $T_0$, flow through the output lines 53' and 53 in a branched manner and are read out from the output terminals 54' and 54. Here, since the paired MOSFETs $M_0'$ and $M_0$ have substantially equal electrical characteristics, the readout signals appearing at the output terminals 54' and 54 consist of a spike noise component and a signal component which have the same wave forms. Thus, a zero output is provided from the output terminal 59 of the differential amplifier 58.

The charges of the auxiliary photodiode $D_{10}$ and the transmission line $T_0$ are cleared by this operation. When the paired MOSFETs $M_1'$ and $M_1$ are subsequently turned on, the storage charges of the photodiode $D_{11}$ transmitted to the transmission line $T_1$ are fed through the MOSFET $M_1$ and the output line 53 and are read out from the output terminal 54. The readout output contains the signal component corresponding to the stored charges of the photodiode $D_{11}$ and the spike noise component. On the other hand, since the charges of the auxiliary photodiode $D_{10}$ and the transmission line $T_0$ have been already cleared, an output read out from the output terminal 54' through the MOSFET $M_1'$ and the output line 53' contains only spike noise. Here, since the paired MOSFETs $M_1'$ and $M_1$ also have substantially equal electrical characteristics, the spike noise components appearing at the output terminals 54 and 54' are equal. Therefore, only the signal component contained in the readout output from the output terminal 54 is provided from the output terminal 59 of the differential amplifier 58 at an amplified level, and the spike noise is essentially eliminated. The magnitude of the output corresponds to the quantity of optical information incident on the photodiode $D_{11}$. When the paired MOSFETs $M_2'$ and $M_2$ are thereafter turned on, the stored charges of the photodiode $D_{12}$ transmitted to the transmission line $T_2$ are read out from the output terminal 54 through the MOSFET $M_2$ and the output line 53. The readout output contains the signal component corresponding to the stored charges of the photodiode $D_{12}$ and the spike noise component.

On the other hand, the stored charges of the photodiode $D_{11}$ and the transmission line $T_1$ have already been read out, so that a readout output read out from the output terminal 54' through the MOSFET $M_2'$ and the output line 53' contains only spike noise. Consequently, as in the above explanation, only the amplified signal component of a magnitude corresponding to the quantity of optical information injected into the photodiode $D_{12}$ is provided from the output terminal 59 of the differential amplifier 58, and the spike noise is likewise essentially eliminated. In this way, only the amplified signal components having magnitudes corresponding to the quantities of optical information injected into the photodiodes $D_{13}$, $D_{14}$ ... , $D_{1n}$ are thereafter provided from the output terminal 59 of the differential amplifier 58 in sequence, and spike noises are essentially eliminated.

As is apparent from the above description, each of the photodiode-transmission line sets ($D_{10}$, $T_0$), ($D_{11}$, $T_1$), ($D_{12}$, $T_2$) ... effects immediately after the signal readout operation, the spike noise-generating operation for the differential operation of the next set. At this time, the clearing of the charges left unread is simultaneously carried out. Since the charges left unread are usually of a very small quantity, they exert only a negligible influence on the differential amplification of the readout output of the next set. In contrast, they have a great effect on the prevention of a residual image.

The paired MOSFETs $M_n'$ and $M_n$ turn on, and the readout of the stored charges of the photodiode $D_{1n}$ transmitted to the transmission line $T_n$ is completed. Then, the paired MOSFETs $M_0'''$ and $M_0''$ turn on and the unread charges of the set of the photodiode $D_{1n}$ and the transmission line $T_n$ flow through the output lines 53' and 53 in a branched manner and read out from the output terminal 54' and 54. This operation is similar to the clear operation for the auxiliary photodiode $D_{10}$ and the transmission line $T_0$, and only the zero output appears from the output terminal 59 of the differential amplifier 58. Through the operation stated above, only the amplified signal components of the magnitudes corresponding to the quantities of optical information injected into the respective photodiodes $D_{11}$, $D_{12}$ ... $D_{1n}$ are sequentially read out from the output terminal 59 of the differential amplifier 58, and the spike noise is substantially eliminated.

Subsequently, when the vertical address pulse is shifted to the input line $Y_2$, the readout of optical information incident on the respective photodiodes $D_{21}$, $D_{22}$ ... $D_{2n}$ is carried out in the same way as the foregoing operation. Thereafter, the readout is likewise effected. Finally, the vertical address pulse is applied to the input line $Y_m$, and the readout of optical information incident on the respective diodes $D_{m1}$, $D_{m2}$ ... $D_{mn}$ is effected. Then, the readout of optical information injected on all the photodiodes in FIG. 5 is completed. The vertical address pulse returns to the input line $Y_1$ again, and repeats the same operation. The auxiliary photodiodes $D_{10}$, $D_{20}$ ... $D_{m0}$ are used in order to generate spike noise for the differential operation at the readout of the optical information injected on the photodiodes $D_{11}$, $D_{21}$ ... $D_{m1}$, respectively. Whatever optical information may be incident on the respective auxiliary photodiodes, only the zero output appears from the output terminal 59 of the differential amplifier 58 due to the foregoing branched flow and differential amplification operation at the clearing operation, based on the application of the horizontal address pulse $X_0$.

Part (A) in FIG. 6 schematically shows output voltages from the output terminal 59 of the differential amplifier 58 where determined optical information is incident on all the photodiodes in FIG. 5.

As is apparent from the above detailed description, the image sensor in FIG. 5 according to the present invention is an extraordinarily excellent low noise image sensor which can easily eliminate spike noise and can amplify and sequentially read out only the signal components corresponding to the quantities of optical information injected on the photodiodes, with very simple construction and merely by connecting the output terminal for the signal readout and the output terminal for the differential operation to the two input terminals of the differential amplifier. In particular, spike noise components generated by two adjacent MOSFETs of equal electrical characteristics are cancelled by the use of the differential amplifier means, so that the influence of difference of elemental structure characteristics within the image sensor are extremely small, which facilitates the manufacture of a large scale image sensor. The effect is, therefore, very great.

Figure 7A:
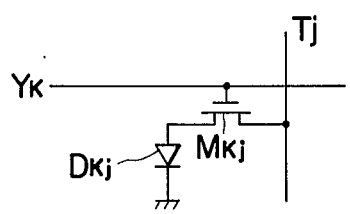
FIGS. 7a and 7b are partial diagrammatic views of a photosensor portion, showing a modification in which a phototransistor is employed in place of the photodiode in FIG. 5.
Figure 7B:
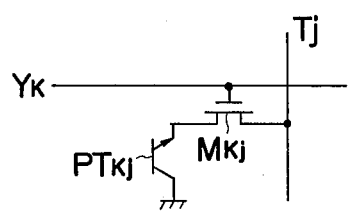

While the embodiment in FIG. 5 relates to the photodiode — MOSFET system, each photodiode may be substituted by a phototransistor as illustrated in FIGS. 7a and 7b as a modification of this embodiment. FIG. 7a shows any photodiode — MOSFET set ($D_{kj}$, $M_{kj}$) (where $k$ and $j$ denote integers, $1 \leq k \leq m$ and $0 \leq j \leq n$) used in the image sensor in FIG. 5, while FIG. 7b shows a modified embodiment employing a phototransistor $PT_{kj}$ in place of the photodiode in FIG. 7a. Even when m × n phototransistor — MOSFET sets as in FIG. 7b are arrayed in the form of a matrix as in FIG. 5, an operation similar to that of the circuit in FIG. 5 can be effected.

Figure 8:
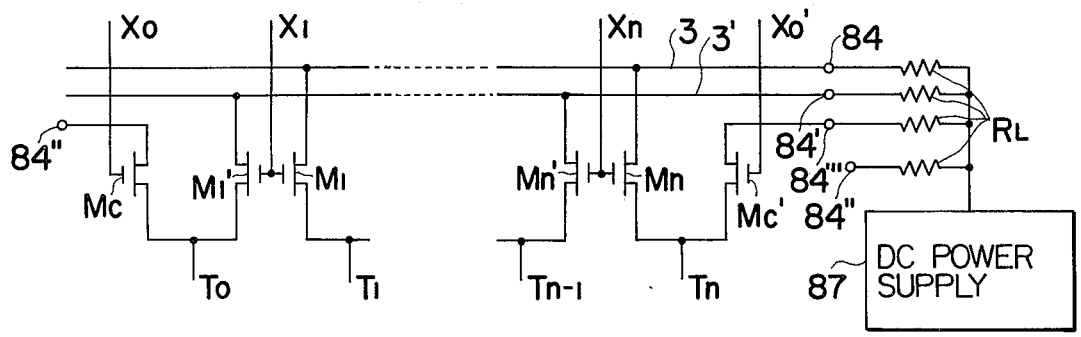
FIG. 8 is a partial diagrammatic view showing a modification of a portion of clearing MOSFET pairs in FIG. 5.

As another modification of the embodiment in FIG. 5, the parts of the clearing MOSFET pairs ($M_0''$, $M_0$) and ($M_0'''$, $M_0''$) in FIG. 5 may be changed as in FIG. 8. Referring to FIG. 8, $M_c$ and $M_c'$ indicate clearing MOSFETs which belong to the transmission lines $T_0$ and $T_n$, respectively. The drain terminals $84''$ and $84'''$ of the MOSFETs $M_c$ and $M_c'$ are connected through load resistors $R_L$ to a DC bias power source 87. Consequently, even when the horizontal address pulses $X_0$ and $X_0'$ are applied to the gates of the respective MOSFETs $M_c$ and $M_c'$ to thereby clear the stored charges of the transmission lines $T_0$ and $T_n$ and the photodiode groups respectively belonging thereto ($D_{10}$, $D_{20}$ ... $D_{m0}$) and ($D_{1n}$, $D_{2n}$ ... $D_{mn}$), outputs from output terminals 84 and 84' are not affected. The operating principle for the elimination of spike noise is the same as in the case of FIG. 5.

As explained above, in detail, in connection with the embodiments, the present invention provides a low noise image sensor which is of simple construction, which can easily and substantially eliminate spike noise by the use of a differential amplifier and which permits a large scale integration. It is very useful when employed for a television camera etc. in which a large signal-to-noise ratio is required and which requires a large scale integration.

We claim:

1. A semiconductor image pick-up device comprising: first and second photodetectors;
   a first pair of field-effect transistors having their sources connected to said first photodetector;
   a second pair of field-effect transistors having their sources connected to said second photodetector;
   a first output line which interconnects the drains of each respective one of the transistors of said first and second pairs of field-effect transistors;
   a second output line which interconnects the drains of each respective other of the transistors of said first and second pairs of field-effect transistors;
   an input line which interconnects the gate of the one transistor of said first pair of transistors to the gate of the other transistor of said second pair of transistors;
   first circuit means which is connected to said first and second output lines for generating a signal representative of the difference of signals appearing on said first and second output lines; and
   second circuit means for applying a signal readout pulse to said input line when said first photodetector has no optical input stored therein.

2. A semiconductor image pick-up device according to claim 1, wherein said photodetectors comprise photodiodes the ends of which, opposite the sources of the field-effect transistors to which they are connected, are connected to a source of reference potential.

3. A semiconductor image pick-up device according to claim 1, wherein each of said photodetectors and field-effect transistors is integrated in a common substrate.

4. A semiconductor image pick-up device comprising:
   at least one column of image pick-up elements which includes:
   first to $n^{th}$ photodetectors, where $n$ is an integer greater than two;
   first to $n^{th}$ pairs of field-effect transistors the sources of each transistor of each respective first to $n^{th}$ pair being connected to said first to $n$ photodetectors;
   a first output line which interconnects the drains of each respective one of the transistors of said first to $(n-1)^{th}$ pairs of field-effect transistors;
   a second output line which interconnects the drains of each respective other of the transistors of said first to $n^{th}$ pairs of field-effect transistors;

a first input line which is connected to the gate of the other of the transistors of said first pair of field-effect transistors;

second to $n^{th}$ input lines which interconnect the gates of each of the transistors of said first to $(n-1)^{th}$ pairs of field-effect transistors to the gates of each other of the transistors of said second $n^{th}$ pairs of field-effect transistors, respectively;

an $(n+1)^{th}$ input line which is connected to the gate of one of the transistors of said $n^{th}$ pair of field-effect transistors;

a differential amplifier circuit connected to said first and second output lines; and circuit means for applying signal readout pulses sequentially to said first to $n^{th}$ lines.

5. A semiconductor image pick-up device according to claim 4, where said at least one column comprises m of said columns, where m is an integer greater than one, the respective, and first to $(n+1)^{th}$ input lines of each column being connected together, so as to form a matrix of image pick-up elements.

6. A semiconductor image pick-up device comprising at least one column of image pick-up elements which includes:

first to $n^{th}$ photodetectors, where n is an integer greater than two, first to $n^{th}$ pairs of field-effect transistors, the source of each transistor of each respective first to $n^{th}$ pair being connected to said first to $n^{th}$ photodetectors;

first and second auxiliary photodetectors, first and second auxiliary field effect transistors the sources of which are respectively connected to said first and second auxiliary photodetectors, a first output line which interconnects the drains of each respective one of the transistors of said first to $n^{th}$ pairs of field-effect transistors and the drain of said first auxiliary field-effect transistor, a second output line which interconnects the drains of each respective other of the transistors of said first to $n^{th}$ pairs of field-effect transistors and the drain of said second auxiliary field-effect transistor.

a first input line which interconnects the gate of said first auxiliary field-effect transistor and the gate of the other transistor of said first pair of field-effect transistors, second to $n^{th}$ input lines which interconnect the gates of each respective one of the transistors of said first to $(n-1)^{th}$ pairs of field-effect transistors and the gates of each respective other of the transistors of said second to $n^{th}$ pairs of field effect transistors, respectively, a clearing drive line which interconnects the gate of the one of the transistors of said $n^{th}$ pair of field-effect transistors and the gate of said second auxiliary field-effect transistor, and a differential amplifier circuit connected to said first and second output lines; and circuit means for applying signal readout pulses sequentially to said first to $n^{th}$ input lines.

7. A semiconductor image pick-up device according to claim 6, wherein said photodetectors comprise photodiodes the ends of which, opposite the sources of the field-effect transistors to which they are connected, are connected to a source of reference potential.

8. A semiconductor image pick-up device according to claim 6, where said at least one column comprises m of said columns, where m is an integer greater than one, the respective clearing drive line, and first to $n^{th}$ input lines of each column being connected together, so as to form a matrix of image pick-up elements.

9. A semiconductor image pick-up device according to claim 6, wherein each of said photodetectors and field-effect transistor is integrated in a common substrate.

10. A semiconductor image pick-up device comprising:

a matrix of m rows by n columns of photodetectors, where m and n are positive integers greater than one and three, respectively;

a matrix of m rows by n columns of field-effect transistors, the source of each respective transistor for each respective row and column being connected to the photodetector in that row and column;

first to $m^{th}$ vertical address pulse input lines which interconnect the gates of the field-effect transistors of the first to $m^{th}$ rows, respectively;

first to $n^{th}$ transmission lines which interconnect the drains of the field effect transistors of the first to $n^{th}$ columns; respectively;

first, second and third field effect transistors, the sources of which are connected in common to said first transmission line;

first to $(n-2)^{th}$ pairs of field effect transistors, the sources of which are connected in common to said second to $(n-1)^{th}$ transmission lines, respectively;

fourth, fifth and sixth field-effect transistors, the sources of which are connected in common to said $n^{th}$ transmission line;

a first output line which interconnects the drain of said second field-effect transistor, the drains of one of the transistors of said first to $(n-2)^{th}$ pairs of field-effect transistors, and the drains of said fourth and sixth field effect transistors;

a second output line which interconnects the drains of said first and third field-effect transistors, the drains of the other of the transistors of said first to $(n-2)^{th}$ pairs of field-effect transistors, and the drain of said fifth field-effect transistors;

a first horizontal address pulse input line which interconnects the gates of said first and second field-effect transistors;

a second horizontal address pulse input line which interconnects the gate of said third field-effect transistor and the gate of the one transistor of said first pair of field-effect transistors;

third to $(n-1)^{th}$ horizontal address pulse input lines which interconnect each respective gate of the other transistor of said first to $(n-3)^{th}$ pairs of field-effect transistors and each respective gate of the one of the transistors of said second to $(n-2)^{th}$ pairs of field-effect transistors, respectively;

an $n^{th}$ horizontal address pulse input line which interconnects the gate of the other of the transistors of said $(n-2)^{th}$ pair of field-effect transistors and the gate of said fourth field-effect transistor;

an $(n+1)^{th}$ horizontal address pulse input line which interconnects the gates of said fifth and sixth field effect transistors;

a differential amplifier circuit connected to said first and second output lines;

first circuit means for applying vertical address pulses sequentially to said first to $m^{th}$ vertical address pulse input lines; and second circuit means for applying horizontal address pulses sequentially to said first to $(n+1)^{th}$ horizontal address pulse input lines, so that the photodetectors of said matrix of photodetectors are sequentially subjected to readout.

11. A semiconductor image pick-up device according to claim 10, wherein said photodetectors comprise photodiodes the ends of which, opposite the sources of the field-effect transistors to which they are connected, are connected to a source of reference potential.

12. A semiconductor image pick-up device according to claim 10, wherein each of said photodetectors comprises a phototransistor, the emitter of which is connected to the source of a respective field effect transistor, and the collector of which is connected to a source of reference potential.

13. A semiconductor image pick-up device according to claim 12, wherein each of said photodetectors and field-effect transistor is integrated in a common substrate.

14. A semiconductor image pick-up device comprising:

a matrix of m rows by n columns of photodetectors, where m and n are positive integers greater than one;

a matrix of m rows by n columns of field-effect transistors, the source of each respective transistor for each respective row and column being connected to the photodetector in that respective row and column;

first to $m^{th}$ vertical address pulse input lines which interconnect the gate of the field-effect transistors of the first to $m^{th}$ rows, respectively;

first to $n^{th}$ transmission lines which interconnect the drains of the field-effect transistors of the first to $n^{th}$ columns, respectively;

first to $n^{th}$ pairs of field-effect transistors, the sources of which are connected in common and are respectively connected to the first to $n^{th}$ transmission lines;

a first output line which interconnects the drains of each respective one of the transistors of said first to $n^{th}$ pairs of field-effect transistors;

a second output line which interconnects the drains of the other of the transistors of said first to $n^{th}$ pairs of field-effect transistors;

a first horizontal address pulse input line connected to the gate of the one transistor of said first pair of field-effect transistors;

a second horizontal address pulse input line which interconnects the gate of said other of the transistors of said first pair of field-effect transistors and the gate of the one of the transistors of said second pair of field-effect transistors;

third to $n^{th}$ horizontal address pulse input lines which interconnect the gates of each respective other transistor of said second to $(n-1)^{th}$ pairs of field-effect transistors and the gates of each respective one transistor of said third to $n^{th}$ pairs of field-effect transistors, respectively;

an $(n+1)^{th}$ horizontal address pule input line connected to the gate of the other transistor of said $n^{th}$ pair of field-effect transistors;

a differential amplifier circuit connected to said first and second output lines;

first circuit means for applying vertical address pulses sequentially to said first to $m^{th}$ vertical address pulse input lines;

second circuit means for applying horizontal address pulses sequentially to said first to $(n+1)^{th}$ horizontal address pulse input lines;

so that said matrix of m rows by n columns of photodetectors are sequentially subjected to read-out.

15. A semiconductor image pick-up device according to claim 14, wherein said photodetectors comprise photodiodes the ends of which, opposite the sources of the field-effect transistors to which they are connected, are connected to a source of reference potential.

16. A semiconductor image pick-up device according to claim 14, wherein each of said photodetectors comprises a phototransistor, the emitter of which is connected to the source of a respective field effect transistor, and the collector of which is connected to a source of reference potential.

17. A semiconductor image pick-up device according to claim 16, wherein each of said photodetectors and field-effect transistor is integrated in a common substrate.

18. A semiconductor image pick-up device according to claim 10, wherein each of said photodetectors and field-effect transistors are integrated in a common substrate.

19. A semiconductor image pick-up device according to claim 14, wherein each of said photodetectors and field-effect transistors are integrated in a common substrate.

20. A semiconductor image pick-up device comprising:

first to $n^{th}$ photodetectors, where n is an integer greater than two;

first to $n^{th}$ pairs of field-effect transistors, the sources of each transistor of each respective first to $n^{th}$ pair being connected to said first to $n^{th}$ photodetectors;

a first output line which interconnects the drains of each respective one of the transistors of said first to $n^{th}$ pairs of field-effect transistors;

a second output line which interconnects the drains of each respective other of the transistors of said first to $n^{th}$ pairs of field-effect transistors;

a first address-pulse input line connected to the gate of the one transistor of said first pair of field-effect transistors;

second to $n^{th}$ address-pulse input lines which interconnect the gates of each respective other transistor of said first to $(n-1)^{th}$ pairs of field-effect transistors and the gates of each respective one transistor of said second to $n^{th}$ pairs of field-effect transistors;

an $(n+1)^{th}$ address pulse input line connected to the gate of the other transistors of said $n^{th}$ pair of field-effect transistors;

a differential amplifier circuit connected to said first and second output lines; and circuit means for applying address-pulses sequentially to said first to $(n+1)^{th}$ input lines.

21. A semiconductor image pick-up device according to claim 20, wherein said photodetectors comprise photodiodes the ends of which, opposite the sources of the field-effect transistors to which they are connected, are connected to a source of reference potential.

22. A semiconductor image pick-up device according to claim 20, wherein each of said photodetectors and field-effect transistors is integrated in a common substrate.

23. A semiconductor image pick-up device comprising:
- first and second photodetectors disposed adjacent each other;
- a first pair of field-effect transistors having their sources connected to said first photodetector and disposed to receive an optical information input;
- a second pair of field-effect transistors having their sources connected to said second photodetector and disposed to receive an optical information input;
- an auxiliary photodetector, disposed adjacent and first photodetector;
- an auxiliary field-effect transistor, having its source connected to said auxiliary photodetector and disposed to receive no optical information input;
- a first output line which interconnects the drains of one of the transistors of each of said first and second pairs of field-effect transistors;
- a second output line which interconnects the drains of the other of the transistors of each of said first and second pairs of field-effect transistors, and the drain of said auxiliary field-effect transistors;
- a first input line which interconnects the gate of said auxiliary field-effect transistor and the gate of the one transistor of said first pair of field-effect transistors;
- a second input line which interconnects the gate of the other transistor of said first pair of field-effect transistors and the gate of the one transistor of said second pair of field-effect transistors;
- first circuit means, connected to said first and second output lines, for generating a signal representative of the difference of the signals appearing on said first and second output lines;
- second circuit means, coupled to said first input line, for applying a first signal readout pulse to the gates of said auxiliary field-effect transistor and the one transistor of said first pair of field-effect transistors, so as to couple said first photodetector and said auxiliary photodetector to said first and second output lines, respectively, whereby said first circuit means will generate a signal representative of the difference of the signals corresponding to the outputs of said first photodetector and said auxiliary photodetector; and
- third circuit means, coupled to said second input line, for applying a second signal readout pulse, subsequent to said first signal readout pulse, to the gates of the other transistor of said first pair of field-effect transistors and the one transistor of said second pair of field-effect transistors, so as to couple said photodetector and said first photodetector to said first and second output lines, respectively, whereby said first circuit means will generate a signal representative of the difference of the signals corresponding to the outputs of said second photodetector and said first photodetector.

* * * * *